United States Patent
Garrett et al.

(10) Patent No.: US 8,291,703 B2
(45) Date of Patent: Oct. 23, 2012

(54) VARIABLE GEOMETRY TURBINE

(75) Inventors: Stephen Edward Garrett, Huddersfield (GB); John Frederick Parker, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 432 days.

(21) Appl. No.: 12/499,836

(22) Filed: Jul. 9, 2009

(65) Prior Publication Data

US 2010/0037605 A1 Feb. 18, 2010

(30) Foreign Application Priority Data

Jul. 10, 2008 (GB) .................................. 0812602.1

(51) Int. Cl.
*F02D 23/00* (2006.01)
*F01B 25/02* (2006.01)
*F01D 17/12* (2006.01)
*F03D 7/00* (2006.01)
*F04D 15/00* (2006.01)
*F04D 27/00* (2006.01)
*F04D 29/44* (2006.01)
*F04D 29/56* (2006.01)

(52) U.S. Cl. .......................................... 60/602; 415/158

(58) Field of Classification Search .................... 60/602, 60/605.2; 415/144, 145, 147, 157, 158, 165; 417/406, 407

See application file for complete search history.

(56) References Cited

U.S. PATENT DOCUMENTS

| 4,078,378 A | * | 3/1978 | Gold | 60/39.281 |
| 4,292,807 A | * | 10/1981 | Rannenberg | 60/601 |
| 4,460,310 A | | 7/1984 | Plunkett | |
| 4,499,731 A | * | 2/1985 | Moser | 60/602 |
| 4,984,965 A | * | 1/1991 | McKean | 415/155 |

(Continued)

FOREIGN PATENT DOCUMENTS

EP 0 034 915 A1 9/1981

(Continued)

OTHER PUBLICATIONS

UK Search Report from GB0812602.1, Nov. 5, 2008, Cummins Turbo Technologies Limited.

*Primary Examiner* — Thomas Denion
*Assistant Examiner* — Cameron Setayesh
(74) *Attorney, Agent, or Firm* — Krieg DeVault LLP (57) ABSTRACT

A variable geometry turbine has a gas inlet chamber and a gas flow inlet passage downstream of the inlet chamber and upstream of said turbine wheel. The inlet passage is defined between a moveable first wall and a second wall and an actuator is operable to control displacement of the first wall in order to vary the size of the gas flow inlet passage. A piston member defining the first wall or being connected to it is received in a piston chamber and serves to move the first wall as a result of displacement of the piston member in the piston chamber. A bypass passage defined in the housing and extends between the piston chamber and a location in the turbine upstream of the inlet passage for delivering gas to the piston chamber. The bypass passage is disposed such that gas introduced through the bypass passage pressurizes the chamber and applies a force to displace the piston member in a direction that causes the first wall to move towards the second wall. The gas, which may be the exhaust gas from an engine, thus serves to assist the operation of the actuator.

24 Claims, 3 Drawing Sheets

U.S. PATENT DOCUMENTS

| | | | |
|---|---|---|---|
| 5,044,880 A * | 9/1991 | McKean | 415/158 |
| 5,214,920 A * | 6/1993 | Leavesley | 60/602 |
| 5,522,697 A * | 6/1996 | Parker et al. | 415/158 |
| 6,158,956 A * | 12/2000 | Arnold | 415/158 |
| 6,203,272 B1 * | 3/2001 | Walsham | 415/158 |
| 6,679,057 B2 * | 1/2004 | Arnold | 60/602 |
| 6,694,733 B1 * | 2/2004 | Bernardini et al. | 60/602 |
| 6,810,666 B2 * | 11/2004 | Lutz et al. | 60/602 |
| 6,928,816 B2 * | 8/2005 | Leavesley | 60/602 |
| 6,931,849 B2 | 8/2005 | Parker | |
| 7,097,432 B1 | 8/2006 | Lombard et al. | |
| 7,165,401 B2 * | 1/2007 | McEwen et al. | 60/602 |
| 7,249,930 B2 * | 7/2007 | Lombard et al. | 415/145 |
| 7,272,929 B2 * | 9/2007 | Leavesley | 60/602 |
| 7,475,540 B2 * | 1/2009 | Parker | 60/602 |
| 7,497,654 B2 * | 3/2009 | Lavez et al. | 415/1 |
| 7,581,394 B2 * | 9/2009 | Perrin et al. | 60/602 |
| 8,191,368 B2 * | 6/2012 | Garrett et al. | 60/602 |
| 2003/0230085 A1 * | 12/2003 | Sumser et al. | 60/602 |
| 2004/0025504 A1 * | 2/2004 | Perrin et al. | 60/602 |
| 2004/0128997 A1 | 7/2004 | Parker | |
| 2005/0188696 A1 * | 9/2005 | Herz et al. | 60/612 |
| 2005/0262841 A1 * | 12/2005 | Parker | 60/602 |
| 2007/0122268 A1 * | 5/2007 | Lombard et al. | 415/158 |
| 2007/0227142 A1 * | 10/2007 | Blaylock et al. | 60/600 |

FOREIGN PATENT DOCUMENTS

| | | |
|---|---|---|
| EP | 0 884 454 A1 | 12/1998 |
| EP | 1 260 676 A1 | 11/2002 |
| EP | 1 009 917 B1 | 2/2003 |
| WO | WO 02/06636 A1 | 1/2002 |

* cited by examiner

VARIABLE GEOMETRY TURBINE

The present application claims the benefit of British Patent Application No. 0812602.1 filed Jul. 10, 2008, which is incorporated herein by reference.

The present invention relates a variable geometry turbine and to a turbomachine, such as a turbocharger, incorporating such a turbine. It also relates to a method for operating a turbocharger incorporating such a turbine and to an internal combustion engine incorporating a turbocharger having such a turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber defined by the turbine housing and within which the turbine wheel is mounted, an annular inlet passageway arranged around the turbine chamber, an inlet arranged around the inlet passageway, and an outlet passageway extending from the turbine chamber. The passageways and chambers communicate such that pressurised exhaust gas admitted to the inlet chamber flows through the inlet passageway to the outlet passageway via the turbine chamber and rotates the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands.

In one common type of variable geometry turbine, one wall of the inlet passageway is defined by a movable wall member. The position of the wall member relative to a facing fixed wall of the inlet passageway is adjustable to control the width of the inlet passageway. For instance, as gas flowing through the turbine decreases the inlet passageway width may also be decreased to maintain gas velocity and optimise turbine output. Typically, one or other of the moveable wall member and facing fixed wall is provided with vanes and in such an instance is referred to as the "nozzle ring" whereas the fixed wall is typically referred to as the "shroud". The vanes extend into the inlet passageway and through slots provided in the shroud. The moveable wall is generally supported on rods extending parallel to the axis of rotation of the turbine wheel and is moved by an actuator, which is operable to displace the rods in an axial direction.

Various types of actuators may be used to move the moveable wall of the variable geometry turbine including, for example, a pneumatic actuator or a motor and gear transmission which are generally mounted on the outside of the housing and serve to operate a linkage mechanism connected to the moveable wall and housed within the turbocharger.

In operation, the aerodynamic flow of exhaust gas through the turbine inlet exerts a significant load on the moveable wall of the variable geometry turbine and this is transmitted to the actuator. If this "back-drive" is not resisted the nozzle ring is forced to the position where the annular inlet passageway is fully open. Whilst there is a general requirement to provide an actuator with sufficient power capacity to operate the moveable wall this has to be balanced against the restricted space available to accommodate an effective actuator in the turbine and/or turbocharger and the extra cost requirement. The pressure of the gas in the inlet passageway generally pulsates at the firing frequency of the internal combustion engine. This oscillating load on the nozzle ring puts a heavy demand on the actuator and linkage mechanism.

The linkage mechanism that transmits the power from the actuator to the moveable wall member has to be designed to tolerate extreme operating conditions including vibration, high and variable temperatures which can lead to jamming or wear in view of the thermal expansion of the mechanism, and the need for at least some of the parts of the mechanism to operate without lubrication.

It is one object of the present invention, amongst others, to obviate or mitigate the aforementioned disadvantages. It is also an object to provide for an alternative or an improved variable geometry turbine and method of operating the same.

According to a first aspect of the present invention there is provided a variable geometry turbine comprising a turbine wheel mounted within a housing for rotation about a turbine axis, a gas inlet chamber, a gas flow inlet passage downstream of the inlet chamber and upstream of said turbine wheel, the inlet passage being defined between a moveable first wall and a second wall, an actuator operable to control displacement of the first wall in order to vary the size of the gas flow inlet passage, a piston member associated with the first wall and received in a piston chamber defined by a piston chamber wall, the first wall being moveable as a result of displacement of the piston member in the piston chamber, a bypass passage defined in the housing and extending from a location in the turbine upstream of the inlet passage to the piston chamber where it penetrates the piston chamber wall, so that gas in the bypass passage is directed through the piston chamber wall into the piston chamber thus bypassing the inlet passage, the bypass passage being disposed such that gas introduced through the bypass passage pressurises the chamber so as to apply a force that urges the piston member in a direction that causes the first wall to move towards the second wall.

The arrangement is thus such that the pressure of the gas flowing through the inlet passage urges the first wall in a first direction away from the second wall and the gas flowing through the bypass passage is directable into the chamber so as to pressurise the chamber and urge the piston in a second direction which is substantially opposed to the first direction i.e. it tends to urge the first wall towards the second wall so as to reduce the size of the inlet passage. This force can thus be used to relieve some of the force required of the actuator to move the first wall or to maintain it in position against the force applied by the gas flowing in the inlet passage. The bypass passage penetrates the piston chamber wall rather than being defined between the chamber wall and the piston member.

The bypass passage thus allows gas to enter the piston chamber regardless of the position of the piston member relative to the piston chamber.

The arrangement thus allows the use of turbine inlet gas pressure to assist operation of the actuator in displacing the first wall.

In one embodiment the bypass passage may extend from the inlet chamber to the piston chamber. The gas inlet chamber may be a volute.

The piston member may be substantially sealed to the piston chamber or there may be a leak passage between the piston member and the piston chamber.

The piston chamber may be defined in the housing or otherwise. The housing may comprise one or more housing parts. For example it may be provided by a turbine housing and a turbine bearing housing to which the turbine is connected.

A control valve may be provided to control the flow of gas in the bypass passage. It may be situated in or adjacent to the bypass passage or may be located in or adjacent to an outlet passage downstream of the piston chamber. The control valve may also control the opening and closing of a wastegate passage and may be configured to receive control signals from a control system or from the actuator. The control signals may be representative of, for example, the force exerted by the actuator, the power consumed or work done by the actuator or the distance travelled.

The piston member may define said first wall or may be a separate member that is connected directly or indirectly to the first wall. There may be more than one piston member and there may be more than one piston element combining to form the piston member.

In an embodiment where the piston member is a separate member, the piston chamber may be divided into two chamber sections by the piston, the inlet chamber being selectively connectable to each chamber section. The selective connection may be provided by the control valve. Each chamber section may also be selectively connectable to a vent in the housing through which gas may be delivered to atmosphere. The control valve may be operable to a first position in which a first of the chamber sections is in fluid communication with the gas inlet chamber and a second of the chamber sections is in fluid communication with the vent and second position in which the first of the chamber sections is in fluid communication with the vent and the second of the chamber sections is in fluid communication with the gas inlet chamber.

The piston member may be mounted on at least one guide member that is translatable in a direction substantially parallel to the turbine axis in response to operation of the actuator.

The second wall may be fixed and may be defined by the housing. It may be in the form of a ported shroud in the housing.

The first wall may be a substantially annular wall member which may have a central axis arranged to be substantially coaxial with the axis of the turbine. It may extend in a generally radial direction relative to the axis. There may be axially extending wall portions connected to the first wall and received in the piston chamber. The axially extending walls may be sealed against walls of the chamber The substantially annular wall member may support an array of vanes that extend in a direction towards the second wall in a direction substantially parallel to the axis of the turbine.

The housing of the variable geometry turbine may be in more than one part and one of those parts may provide a housing for bearings for a shaft to which the turbine wheel is connected or mounted.

In accordance with another aspect of the present invention there is provided a turbomachine, such as a turbocharger, comprising a variable geometry turbine as defined above and a compressor driven by said turbine. The turbocharger may be connected to an internal combustion engine. The engine may be operated under the control of an engine control system such as an engine management unit which may issue commands to control the operation of the control valve in order to control the position of the first wall or the piston. This may be done is response to received data representative of the position of the first wall or the piston or in response to data representative of the pressure in the piston chamber or representative of the force being applied or power being consumed by the actuator.

According to a second aspect of the present invention there is provided a method for operating a turbocharger having a variable geometry turbine comprising a turbine wheel mounted within a housing for rotation about a turbine axis, an exhaust gas flow inlet passage downstream upstream of said turbine wheel, the inlet passage being defined between a moveable first wall and a second wall, the first wall being moveable as a result of displacement of a piston member in a piston chamber, the piston member being associated with the first wall such that the first wall is moveable as a result of displacement of the piston member in the piston chamber, the method comprising delivering internal combustion engine exhaust gas in a first flow path through the gas flow inlet passage towards the turbine, and directing exhaust gas in a second flow path that bypasses the gas flow inlet passage, passes through a wall of the piston chamber and enters the piston chamber, whereby the gas pressurises the piston chamber on one side of the piston so as to urge displacement of the first wall towards the second wall.

The second flow path of exhaust gas is thus used to assist the gas flow control mechanism in moving the first wall towards the second wall so as to close the inlet passageway. This may serve to reduce the force required to operate the control mechanism.

The exhaust gas may be directed into the second flow path from any location upstream of the inlet passage such as, for example, from an inlet chamber of the turbine.

The flow of exhaust gas in the second flow path may be controlled by means of a control device such as a valve. It may be controlled in response to operating parameters of the turbocharger or an engine to which it is connected. Alternatively it may be controlled in response to data relating to the operation of the actuator such as, for example, a signal representative of the force applied by the actuator, the power consumed by the actuator or the distance travelled. The operation of the control device or valve may be controlled by closed-loop or open-loop signals representative of any of the above.

The exhaust gas may be directed into a piston chamber defined by the housing, the first wall being moveable as a result of displacement of a piston in the piston chamber.

The exhaust gas may be directed into a conduit connected to the chamber for delivering gas to pressurise the chamber so as to act on said piston.

According to a third aspect of the present invention there is provided an internal combustion engine having an air inlet flow path and an exhaust gas outlet flow path and a turbocharger comprising a compressor in said inlet flow path and a variable geometry turbine in said exhaust flow path, the variable geometry turbine comprising a turbine wheel mounted within a housing for rotation about a turbine axis, an inlet chamber, a gas flow inlet passage downstream of the inlet chamber and upstream of said turbine wheel, the inlet passage being defined between a moveable first wall and a second wall, an actuator operable to control displacement of the first wall in order to vary the size of the gas flow inlet passage, a gas flow control mechanism comprising a piston member received in a piston chamber defined by a piston chamber wall in the housing, the first wall being moveable as a result of displacement of the piston member in the piston chamber, a bypass passage defined in the housing and extending from a location in the turbine upstream of the inlet passage to the piston chamber where it penetrates the piston chamber wall, so that gas in the bypass passage is directed through the piston chamber wall into the piston chamber thus bypassing the inlet passage, the bypass passage being disposed such that exhaust gas introduced through the bypass passage pressurises the chamber so as to apply a force that urges the piston member in a direction that causes the first wall to move towards the second wall.

Specific embodiments of the present invention will now be described, by way of example only, with reference to the accompanying drawings, in which.

Figure 1:
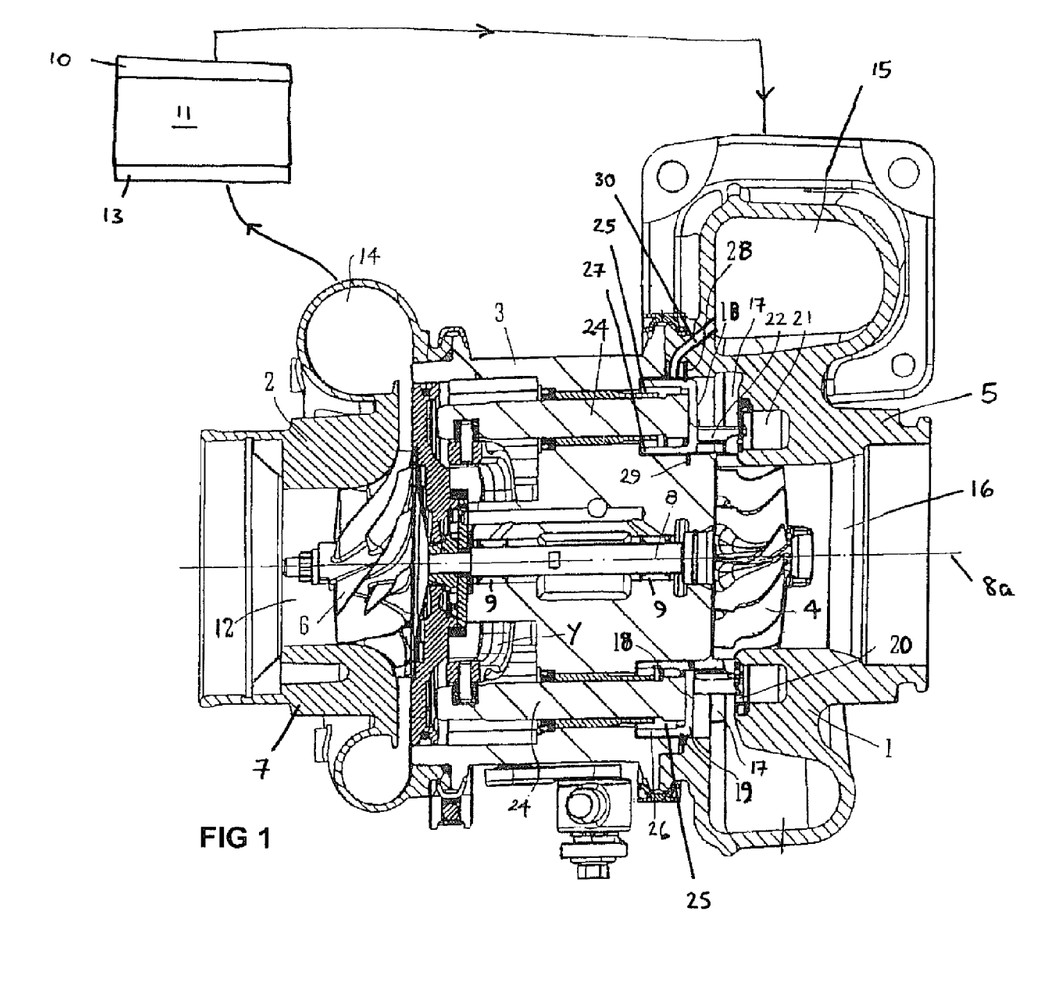
FIG. 1 is a longitudinal sectioned view through a turbocharger fitted with a variable geometry turbine in accordance with the present invention and shown connected to an internal combustion engine which is represented schematically.

Referring to FIG. 1, the illustrated turbocharger comprises a turbine 1 joined to a compressor 2 via a central bearing housing 3. The turbine 1 comprises a turbine wheel 4 rotating within a turbine housing 5. Similarly, the compressor 2 comprises a compressor wheel 6 that rotates within a compressor housing 7. The turbine wheel 4 and compressor wheel 6 are mounted on opposite ends of a common turbocharger shaft 8 that extends through the central bearing housing 3.

As is conventional, the bearing housing 3 has a central portion which houses journal bearing assemblies 9 located towards the compressor and turbine ends of the bearing housing respectively.

In use, the turbine wheel 4 is rotated about axis 8a by the passage of exhaust gas passing over it from the exhaust manifold 10 of an internal combustion engine 11. This in turn rotates the compressor wheel 6 that draws intake air through a compressor inlet 12 and delivers boost air to the inlet manifold 13 of the internal combustion engine via an outlet volute 14.

The turbine housing 5 defines an inlet chamber 15 (typically a volute) to which the exhaust gas from the exhaust manifold 10 of the internal combustion engine 11 is delivered. The exhaust gas flows from the inlet chamber 15 to an axially extending outlet passageway 16 via an annular inlet passageway 17 and the turbine wheel 4. The inlet passageway 17 is defined on one side by the face of a radially extending portion 18 of a movable annular wall member 19, commonly referred to as a "nozzle ring", and on the opposite side by an annular shroud plate 20. The shroud plate 20 covers the opening of an annular recess 21 in the turbine housing 5.

The nozzle ring 19 supports an array of circumferentially and equally spaced inlet vanes 22 each of which extends axially across the inlet passageway 17 from the radially extending wall portion 18 of the moveable wall 19. The vanes 22 are orientated to deflect gas flowing through the inlet passageway towards the direction of rotation of the turbine wheel 4. The vanes 22 project through suitably configured slots in the shroud plate 20, into the recess 21. The exterior surfaces of the vanes 22 are in close proximity to the edges of the slots so as to prevent any significant flow of gas into the recess 21 when the nozzle ring 19 is proximate the shroud plate 20.

The speed of rotation the turbine wheel 4 is dependent upon the velocity of the gas passing through the annular inlet passageway 17. For a fixed rate of mass of gas flowing into the inlet passageway, the gas velocity is a function of the gap between the radial portion 18 of the nozzle ring 19 and the shroud plate 20, which gap defines the passageway 17 and is adjustable by controlling the axial position of the nozzle ring (as the inlet passageway 17 gap is reduced, the velocity of the gas passing through it increases).

The nozzle ring 19 is movable by an actuator (not shown) in an axial direction within a chamber 25 defined in the bearing housing 3 on a pair of diametrically opposed guide rods 24. The rods 24 extend in the bearing housing 3 in a direction that is substantially parallel to that of the turbocharger shaft 8 and are arranged to translate in that direction. As well as the radially extending wall portion 18 the nozzle ring 19 has two spaced axially extending walls 26, 27 that are sealed against the walls of the chamber 25 by seals 28, 29. It will thus be understood that the nozzle ring 19 operates very much in the manner of a piston slidably disposed in a piston chamber (the chamber 25).

A drive mechanism for driving the guide rods 24 comprises the actuator and a transmission mechanism, which in this instance, takes the form of a yoke Y that is connected to the guide rods such the actuator causes pivoting movement of the yoke which is converted into translation of the guide rods 24 and therefore the nozzle ring 19. It is to be appreciated that the drive mechanism may take any suitable form for effecting translation of the nozzle ring 19. The actuator may be, for example, a pneumatic actuator or an electric motor with gears.

A bypass passage 30 is defined in the turbine housing 5 between the inlet chamber 15 and the nozzle ring chamber 25 and serves to direct some exhaust gas into the chamber 25 behind the radial wall portion 18 of the nozzle ring 19. The term "behind" is used to mean that the exhaust gas is directed into the chamber 25 so as to act on the radial wall portion 18 on the opposite side to the gas passing through the inlet passageway 17 to the turbine wheel 4. The bypass passage 30 serves to introduce the exhaust gas behind the nozzle ring 19 by opening into the chamber through a wall thereof rather than allowing the exhaust gas to pass through an aperture in the nozzle ring 19 or between the nozzle ring and a wall of the chamber 25. Since the chamber 25 is sealed to the nozzle ring 19 by virtue of the seals 28, 29 acting on the axially extending walls 26, 27 the exhaust gas pressurises the chamber 25 behind the nozzle ring 19 and serves to urge the ring in a direction towards the shroud plate 20 and against the force applied to the nozzle ring by the exhaust gas passing through the inlet passageway 17. This serves to reduce the force that the actuator has to apply to move the nozzle ring 19 to the desired location with respect to the shroud plate 20.

It will be understood that exhaust gas could be directed into the chamber from a location upstream of the inlet chamber, including from any location in the exhaust flow path from the exhaust manifold 10 to the inlet chamber 15 of the turbine.

It is also to be understood that the positions of the nozzle ring 19 and the shroud plate 20 may be reversed. That is, the nozzle ring 19 may be arranged such that it is received in a chamber defined in the turbine housing 5 and the shroud 20 disposed in or adjacent to the bearing housing 3 such that the nozzle ring 19 moves in the opposite direction to that shown in FIG. 1 to reduce the size of the inlet passage. In a further variation the nozzle ring may be fixed and the shroud plate 20 may move relative to the ring 19 over the vanes 22, the plate being connected to a piston movable in a sealed piston chamber.

Figure 2:
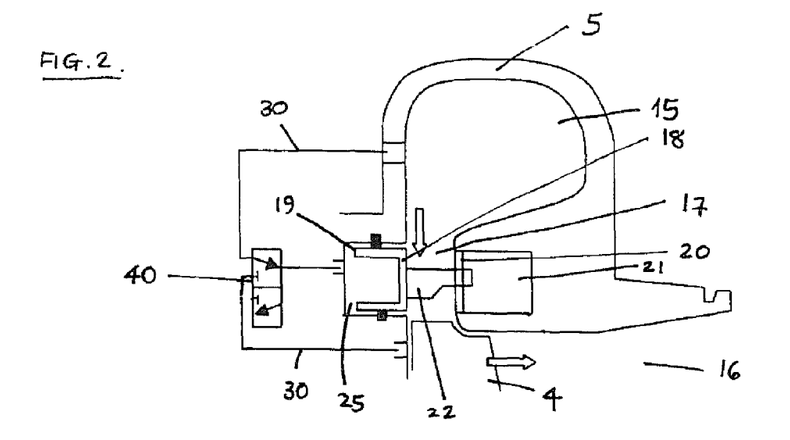
FIG. 2 is a schematic representation of part of a first alternative embodiment of a variable geometry turbine of the turbocharger of FIG. 1.

In the embodiment of FIG. 2, the bypass passage 30 between the inlet chamber 15 and the nozzle ring chamber 25 is interrupted by a valve 40 that is operated to control the delivery of the exhaust gas to the chamber 25 and therefore to control the force applied to the rear of the nozzle ring 19 by the exhaust gas. This force acts in opposition to the force imparted by the passage of the exhaust gas through the inlet passageway 17 and over radial wall 18 of the nozzle ring 19 and serves to reduce the force that has to be applied by the actuator to move the nozzle ring 19 to reduce the size of the inlet passageway 17.

The actuator may comprise, for example, an electric motor with a suitable transmission mechanism (e.g. gears, a leadscrew and a linkage) for converting the rotation of the motor shaft to translation of the nozzle ring on the guide rods, or a pneumatic cylinder with a suitable linkage.

The valve 40 shown in FIG. 2 is a two-position, three way valve. In a first position, as depicted, it is effectively open such that exhaust gas is directed through the bypass passage 30 from the inlet chamber 15 to the chamber 25. In a second position, the valve 40 is effectively closed with the bypass passage 30 from the inlet chamber 15 being blocked and the piston chamber being vented to the turbine wheel 4.

The operation of the valve 40 may be actively controlled in response to certain operating parameters of the engine or turbocharger (e.g. boost pressure, turbine inlet pressure, engine speed or engine load) so that the pressure of the exhaust gas in the chamber 25 is controlled. For example, it may be operated in response to electrical signals generated by the engine management unit (or engine control unit) of the vehicle or any or other control system associated with the turbocharger by using closed-loop or open loop feedback. In another control sequence, the valve 40 opens the bypass passage 30 to direct exhaust gas to the chamber 25 when the control system determines that a force above a certain threshold is required from the actuator to move or hold the nozzle ring 19. It will be appreciated by the skilled person that electrical actuators can be provided with appropriate sensors to determine the forces being applied by the actuator. For example the torque being applied or the power being expended by an electrical motor can be readily determined by using the appropriate transducer arrangements.

The nozzle ring 19 may or may not be provided with pressure balance holes in the radially extending wall 18. The absence of pressure balance holes or other leakage paths through or around the nozzle ring enables a single nozzle ring design to be used for a turbocharger without the need to tailor the balance holes or leakage paths to the specific application. In some instances, the presence of a small number of balance holes may be desirable in order to balance out the effect of pressure pulses in the exhaust gas flow past the nozzle ring. In the instance where there are no holes the control system may be operated to open the bypass passage 30 at the frequency of the pressure pulses on the nozzle ring 19.

The control system may be operated so as to modulate the pressure applied to the chamber 25 such that the resulting force on the nozzle ring 19 is effectively controlled to allow the actuator to operate with a range of force limits. The determined force being applied by the actuator (e.g. the torque being applied by a motor actuator assembly) is used to generate a closed-loop feedback signal that serves to control the valve so as to vary the pressure in the chamber 25 behind the nozzle ring 19 accordingly. In such an instance the valve 40 may be electrically controlled. In this arrangement the effort required by the actuator to operate the nozzle ring 19 can be maintained within pre-selected limits during all operating conditions of the engine.

In an open-loop control system, rather than actively monitoring the force applied by the actuator, the system may be provided with predetermined operating profiles or "maps" specific to each turbocharger application whereby the desired pressure in the chamber is mapped against engine operating parameters or parameters relating to the performance of the actuator such as, for example, the force it exerts, the power it consumes or its position, or relating to the position of the nozzle ring or any part of the drive mechanism.

The exhaust gas pressure applied to the back of the nozzle ring 19 pulses at the same rate as that at the front face in the inlet passageway 17, thus eliminating the pulsating load applied to the actuator and associated mechanism.

In a slight modification to the nozzle ring 19 of FIG. 1 or 2, at least one aperture or slot may be provided in one or both of the axially extending walls 26, 27 at a position such that it is open to allow the exhaust gas to flow through the nozzle ring 19 to escape to the turbine wheel 4 when the actuator reaches a predetermined position that coincides with high forces being experienced by the nozzle ring 19.

Figure 3:
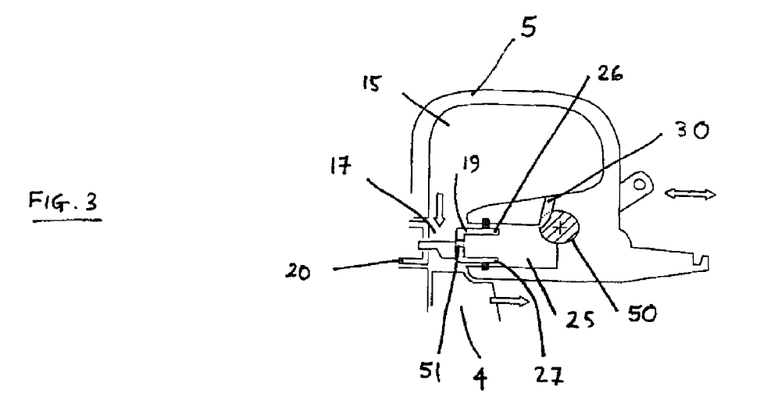
FIG. 3 is a schematic representation of part of a second alternative embodiment of a variable geometry turbine in accordance with the present invention.

In the embodiment illustrated in FIG. 3, a valve 50 is provided in the bypass passage 30 and serves to direct exhaust gas from the inlet chamber 15 in a selective manner to the chamber 25 behind the nozzle ring 19. In this instance the nozzle ring 19 is shown located in a chamber 25 in the turbine housing 5 rather than the bearing housing 3 and the shroud plate 20 on the opposite side of the inlet passageway 17. The valve 50 is a rotary barrel type valve. In this particular embodiment the radially extending wall 18 of the nozzle ring 19 is perforated by a plurality of small diameter leakage apertures 51 to ensure that the static pressures on each side of the nozzle ring 19 are substantially equalised, as is known in the art. It will be understood that this same effect could be achieved by providing a leak passage between one or both of the axially extending walls 26, 27 of the nozzle ring 19 and the wall of the chamber 25. Provided the cross-section area of bypass passage 30 is substantially greater than the combined area of apertures 51, then the pressure in the cavity 25 can be controlled between an upper limit set by the pressure in the volute 15, and the static pressure in the gas path at the holes 51. The static pressure in the main exhaust gas flow through the inlet passage way 17 generally decreases in the direction towards the turbine axis 8a. In particular the path between the vanes 22 is typically convergent in this direction such that the pressure falls steeply.

Figure 4:
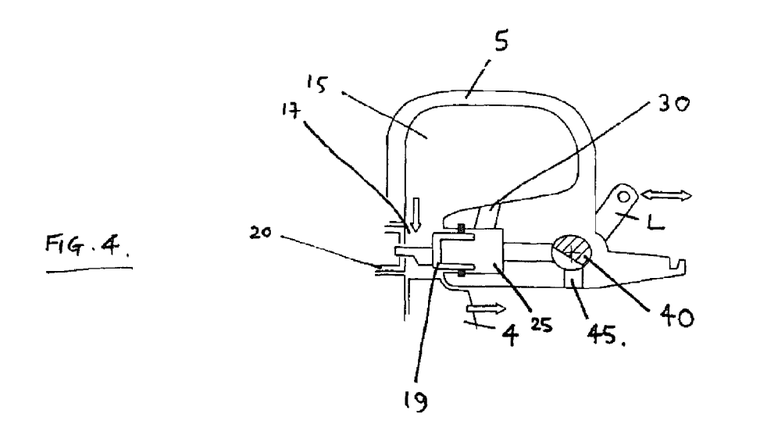
FIG. 4 is a schematic representation of part of a third alternative embodiment of a variable geometry turbine in accordance with the present invention.

A variation to the arrangement of the present invention is shown in FIG. 4 in which the valve 40 is provided in an outlet passage 45 that extends from the nozzle ring chamber 25 rather than in the bypass passage 30 from the inlet chamber 15. It is to be appreciated that the provision of an outlet passage 45 and valve 40 could be used in an embodiment where the nozzle ring 19 is disposed in a chamber in the bearing housing 3 and the shroud plate 20 is provided in the turbine housing 5. The valve 40 is operable by a lever L or the like that is accessible on the outside of the turbine housing 5. When the valve 40 is operated to close the outlet passage 45, the exhaust gas pressurises the chamber 25 via the bypass passage 30. Since the exhaust gas on the other side of the nozzle ring accelerates through the vanes, the static pressure in the chamber 25 will generally be higher and as a result the net force tends to move the nozzle ring 19 out of the chamber 25 so as to reduce the size of the inlet passageway 17. When the valve 40 is opened as represented in FIG. 4, the bypassed exhaust gas flows through the chamber 25 and out through the outlet passage 45 to the turbine outlet 16. The resulting pressure drop in the chamber 25 allows the nozzle ring 19 to move to the right under the influence of the force applied by the exhaust gas in the inlet passageway. This serves to increase the size of the inlet passageway 17. The valve 40 could be controlled in such a way that even after the nozzle ring 19 has reached the limit of its travel to leave the inlet passageway 17 fully open, the valve 40 is maintained in the open condition to serve as a wastegate. In some applications this may allow the turbine size to be reduced in comparison to that which is currently employed.

Figure 5:
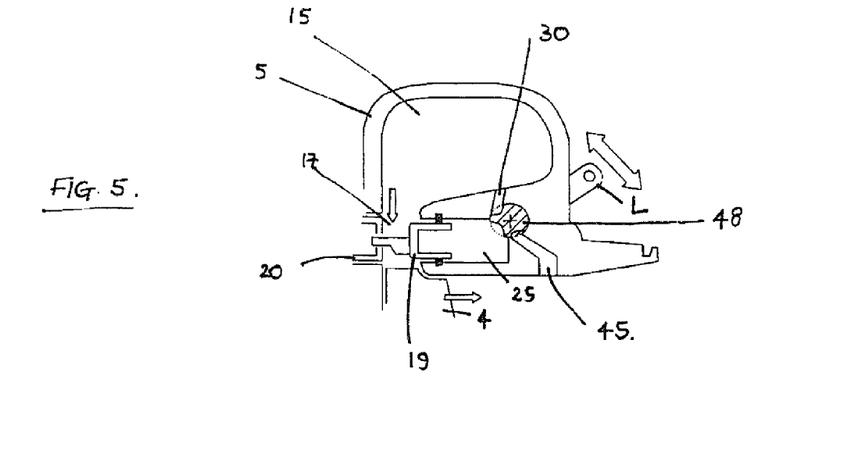
FIG. 5 is a schematic representation of part of a fourth alternative embodiment of a variable geometry turbine in accordance with the present invention.

The embodiment of FIG. 5 illustrates an alternative valve configuration that can be operated selectively to open or close both the bypass passage 30 and the outlet passage 45. Again a rotary barrel valve 48 is depicted but other valve types could be used. In the orientation shown both the bypass passage 30 and the outlet passage 45 are closed. In a second position the bypass passage 30 is in fluid communication with chamber 25 so that exhaust gas is used to pressurise the chamber 25. In another position the bypass passage is closed and the chamber 25 is in fluid communication with the outlet passage 45 so that the chamber 25 can be vented and in a further position the bypass passage 30 may be connected directly to the outlet passage 45 thereby bypassing the chamber 25 and serving as a direct wastegate.

Figures 6, 6A:
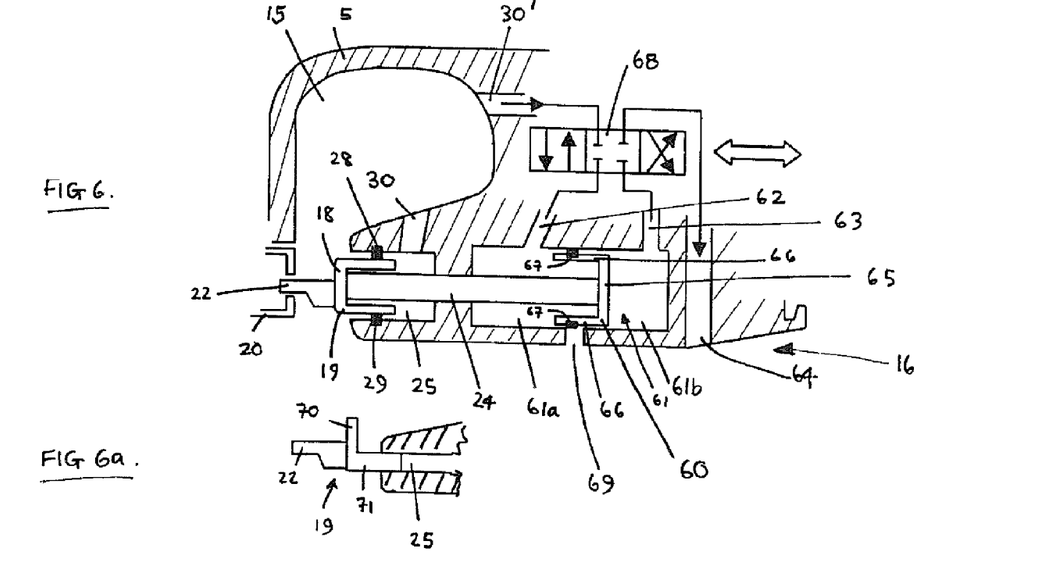
FIG. 6 is a schematic representation of part of a fifth alternative embodiment of a variable geometry turbine in accordance with the present invention.
FIG. 6a is a schematic representation of an alternative embodiment of a nozzle ring for any of the variable geometry turbine embodiments of FIGS. 1 to 6.

In the embodiment of FIG. 6, a second annular piston 60 is connected to the nozzle ring 19 by means of its guide rods 24. The second annular piston 60 is reciprocally disposed in a piston chamber 61 that is defined in the turbine housing 5 at a location that is axially spaced from the chamber 25 in which the nozzle ring 19 resides. The second piston 60 serves to control the displacement of the nozzle ring 19 as will be described.

As in the preceding embodiments the nozzle ring 19 of the FIG. 6 embodiment is moveable in the chamber 25 which is supplied with exhaust gas from the inlet chamber 15 of the turbine housing via the bypass passage 30. In this embodiment the supply of exhaust gas pressure to the rear of the nozzle ring 19 in this manner is simply to ensure that forces applied to the nozzle ring by the pressure pulses in the exhaust gas are balanced on both the front and rear faces of the radial wall portion 18. The same effect can be achieved by removing one of the seals 28, 29 or by providing balance apertures (not shown) in the radially extending wall of the nozzle ring 19 itself.

The piston chamber 61 is effectively divided into two chamber sections 61a and 61b by the second piston 60, each chamber being connected to a respective passageway 62, 63 that is selectively put in fluid communication with the inlet chamber 15 of the turbine housing, via a second bypass passage 30', or with a vent passage 64 to the turbine outlet 16. In the particular embodiment shown the second piston 60 takes the same form as the nozzle ring 19 (which is the first piston) with a radially extending wall 65 and a pair of spaced axially extending walls 66 each of which is sealed to a respective wall of the chamber 61 by seals 67. It will be appreciated that the second piston 60 may take any other suitable form and may, in particular, comprise a plurality of discrete piston elements and it need not have the same annular area as the nozzle ring 19.

In the particular embodiment shown a control valve 68, in the form of a three-way electrically operated spool valve operable by a control system such as the engine management unit of the vehicle, controls the direction of flow into and out of the chamber sections 61a or 61b. It will be appreciated that other types of valves may be used. In FIG. 6, the valve is shown in the closed configuration whereby no exhaust gas is directed from the inlet chamber 15 via this route. When the control valve 68 moved to a second position the gas is introduced into the chamber section 61a via the bypass passage 30' and a first passageway 62 and gas is allowed to leave the other chamber section 61b on the opposite side of the piston via a second passageway 63 to the vent passage 64. In a third position the control valve 68 directs gas from the inlet chamber 15 to the piston chamber section 61b via the bypass passage 30' and the second passageway 63 and gas is allowed to leave the chamber section 61a to the vent passage 64.

When the control valve 68 is in the second position the chamber section 61a is pressurised with exhaust gas whereas the chamber section 61b is vented with the result that the second piston 60 and therefore the nozzle ring 19 moves to the right so that the turbine inlet passageway 17 is increased in size. On the other hand when the control valve is in the third position the chamber section 61a is vented and the chamber section 61b is pressurised with exhaust gas with the result that the second piston 60 and the nozzle ring 19 move to the left thereby reducing the size of the turbine inlet passageway 17. In this arrangement there is no requirement for a continuous flow of exhaust gas into the chamber 25 to move the nozzle ring 19

The piston chamber 61 also has an optional wastegate port 69 that is normally closed by the second piston but which is opened when it reaches a certain position and the valve 68 is in the second position, thereby allowing gas to enter chamber section 61a. In the position depicted in FIG. 6 if the piston 65 were to move further to the right the wastegate port 69 would be exposed by the passage of seal 67, and a exhaust gas would flow from bypass passage 30', through the valve 68, chamber section 61a and out the wastegate port 69.

An alternative nozzle ring 19 structure is shown in FIG. 6a in which there is a single radially extending wall 70 and a single axially extending wall 71 that resides in the chamber 25 in the manner of a piston in a piston chamber. The arrangement allows for the force applied to the nozzle ring by the exhaust gas pressure pulses to be equalised by selecting the appropriate surface areas exposed to the gas on each side of the radially extending wall and eliminates the requirement for the bypass passage 30.

In all the embodiments described above the exhaust gas pressure at the exhaust manifold or in the chamber behind the nozzle ring may be measured or estimated so that the position of the nozzle ring can be determined or predicted at any point by the control system. Alternatively a position sensor associated with the nozzle ring or its drive mechanism may be used to provide appropriate signals to the control system.

It is to be appreciated that numerous modifications or variations to the above described embodiments may be made without departing from the scope of the invention as defined in the appended claims. For example, the nozzle ring may take any suitable form. In particular it may be biased in a particular direction by a biasing member such as, for example, a spring.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A variable geometry turbine comprising a turbine wheel mounted within a housing for rotation about a turbine axis, a gas inlet chamber, a gas flow inlet passage downstream of the inlet chamber and upstream of said turbine wheel, the inlet passage being defined between a moveable first wall and a second wall, an actuator operable to control displacement of the first wall in order to vary the size of the gas flow inlet passage, a piston member associated with the first wall and received in a piston chamber defined by a piston chamber wall, the first wall being moveable as a result of displacement of the piston member in the piston chamber, a bypass passage defined in the housing and extending from a location in the turbine upstream of the inlet passage to the piston chamber where it penetrates the piston chamber wall, so that gas in the bypass passage is directed through the piston chamber wall into the piston chamber thus bypassing the inlet passage, the bypass passage being disposed such that gas introduced through the bypass passage pressurises the chamber so as to apply a force that urges the piston member in a direction that causes the first wall to move towards the second wall.

2. A variable geometry turbine according to claim 1, wherein the bypass passage extends from the gas inlet chamber to the piston chamber.

3. A variable geometry turbine according to claim 1, wherein a control valve is provided to control the flow of gas in the bypass passage.

4. A variable geometry turbine according to claim 3, wherein the control valve is situated in, or adjacent to, the bypass passage.

5. A variable geometry turbine according to claim 3, wherein the control valve is situated in, or adjacent, to an outlet passage downstream of the piston chamber.

6. A variable geometry turbine according claim 3, wherein the control valve also controls the opening and closing of a wastegate passage.

7. A variable geometry turbine according to claim 3, wherein the control valve is configured to be operable in response to control signals received from a control system of the turbine.

8. A variable geometry turbine according to claim 1, wherein the piston member defines the first wall.

9. A variable geometry turbine according to claim 1, wherein the piston member is connected directly or indirectly to the first wall.

10. A variable geometry turbine according to claim 3, wherein the piston chamber is divided into two chamber sections by the piston member, the bypass passage being selectively connected for fluid communication with each chamber section.

11. A variable geometry turbine according to claim 10, wherein the selective connection is provided by the control valve.

12. A variable geometry turbine according to claim 11, wherein each chamber section is selectively connectable to a vent in the housing through which gas may be delivered to atmosphere.

13. A variable geometry turbine according to claim 12, wherein the control valve is operable between a first position in which a first of the chamber sections is in fluid communication with the gas inlet chamber and a second of the chamber sections is in fluid communication with the vent and a second position in which the first of the chamber sections is in fluid communication with the vent and the second of the chamber sections is in fluid communication with the gas inlet chamber.

14. A variable geometry turbine according to claim 1, wherein the piston member is mounted on at least one guide member that is translatable in a direction substantially parallel to the turbine axis in response to operation of the actuator.

15. A variable geometry turbine according to claim 1, wherein the first wall supports an array of vanes that extend towards the second wall.

16. A turbomachine comprising a variable geometry turbine as defined in claim 1 and a compressor drivable by the variable geometry turbine.

17. A method for operating a turbocharger having a variable geometry turbine comprising a turbine wheel mounted within a housing for rotation about a turbine axis, an exhaust gas flow inlet passage upstream of said turbine wheel, the inlet passage being defined between a moveable first wall and a second wall, the first wall being moveable as a result of displacement of a piston member in a piston chamber, the piston member being associated with the first wall such that the first wall is moveable as a result of displacement of the piston member in the piston chamber, the method comprising delivering internal combustion engine exhaust gas in a first flow path through the gas flow inlet passage towards the turbine, and directing exhaust gas in a second flow path that bypasses the gas flow inlet passage, passes through a wall of the piston chamber and enters the piston chamber, whereby the gas pressurises the piston chamber on one side of the piston member so as to urge displacement of the first wall towards the second wall.

18. A method according to claim 17, wherein the exhaust gas is directed into the second flow path from an inlet chamber of the variable geometry turbine.

19. A method according to claim 17, wherein the flow of exhaust gas in the second flow path is controlled by means of a control device.

20. A method according to claim 19, wherein the control device is controlled in response to operating parameters of a turbocharger or an engine to which it is connected.

21. A method according to claim 19, wherein the control device is controlled in response to the sensed position of the first wall.

22. A method according to claim 19, wherein the control device is controlled in response to a signal representative of at least one of the force applied by an actuator of the piston member, the power consumed by the actuator or the distance travelled by the actuator or piston member.

23. A method according to claim 17, wherein the second flow path is defined by a bypass passage extending between the inlet chamber and the piston chamber.

24. An internal combustion engine having an air inlet flow path and an exhaust gas outlet flow path and a turbocharger comprising a compressor in said inlet flow path and a variable geometry turbine in said exhaust flow path, the variable geometry turbine comprising a turbine wheel mounted within a housing for rotation about a turbine axis, an inlet chamber, a gas flow inlet passage downstream of the inlet chamber and upstream of said turbine wheel, the inlet passage being defined between a moveable first wall and a second wall, an actuator operable to control displacement of the first wall in order to vary the size of the gas flow inlet passage, a gas flow control mechanism comprising a piston member received in a piston chamber defined by a piston chamber wall in the housing, the first wall being moveable as a result of displacement of the piston member in the piston chamber, a bypass passage defined in the housing and extending from a location in the turbine upstream of the inlet passage to the piston chamber where it penetrates the piston chamber wall, so that gas in the bypass passage is directed through the piston chamber wall into the piston chamber thus bypassing the inlet passage, the bypass passage being disposed such that exhaust gas introduced through the bypass passage pressurises the chamber so as to apply a force that urges the piston member in a direction that causes the first wall to move towards the second wall.

* * * * *